United States Patent [19]

Jackson

[11] Patent Number: 4,606,561

[45] Date of Patent: Aug. 19, 1986

[54] JOURNAL MOUNTED ROTARY JOINT

[75] Inventor: Eldon D. Jackson, Three Rivers, Mich.

[73] Assignee: The Johnson Corporation, Three Rivers, Mich.

[21] Appl. No.: 739,864

[22] Filed: May 31, 1985

[51] Int. Cl.$^4$ .............................................. F16L 39/04
[52] U.S. Cl. ...................................... 285/134; 285/93
[58] Field of Search ................................. 285/93, 134

[56] References Cited

U.S. PATENT DOCUMENTS 2,805,086  9/1957  Shumaker ........................... 285/134
3,061,337 10/1962  Shaw et al. ......................... 285/134
3,484,853 12/1969  Nishi .................................... 285/93

OTHER PUBLICATIONS

"Beloit CS Steamfits" by Paper Machinery Division of Beloit Corporation, Beloit, Wis., 53511, 1982.

Primary Examiner—Cornelius J. Husar
Assistant Examiner—Douglas W. Hanson
Attorney, Agent, or Firm—Beaman & Beaman

[57] ABSTRACT

A rotary joint for a rotating heat exchanging drum directly attached to the end of the drum journal utilizes a flange and adapter to mount a seal on the journal and the joint body is fixed with respect to the journal and supports a seal plate in which an annular seal is biased toward the journal mounted plate by springs. The body mounted seal includes differential pressure area surfaces to balance the fluid pressures imposed thereon, and the springs are isolated from the fluid within the body. The joint eliminates metal-to-metal engagement of moving parts, and the seals may be readily replaced when worn.

9 Claims, 2 Drawing Figures

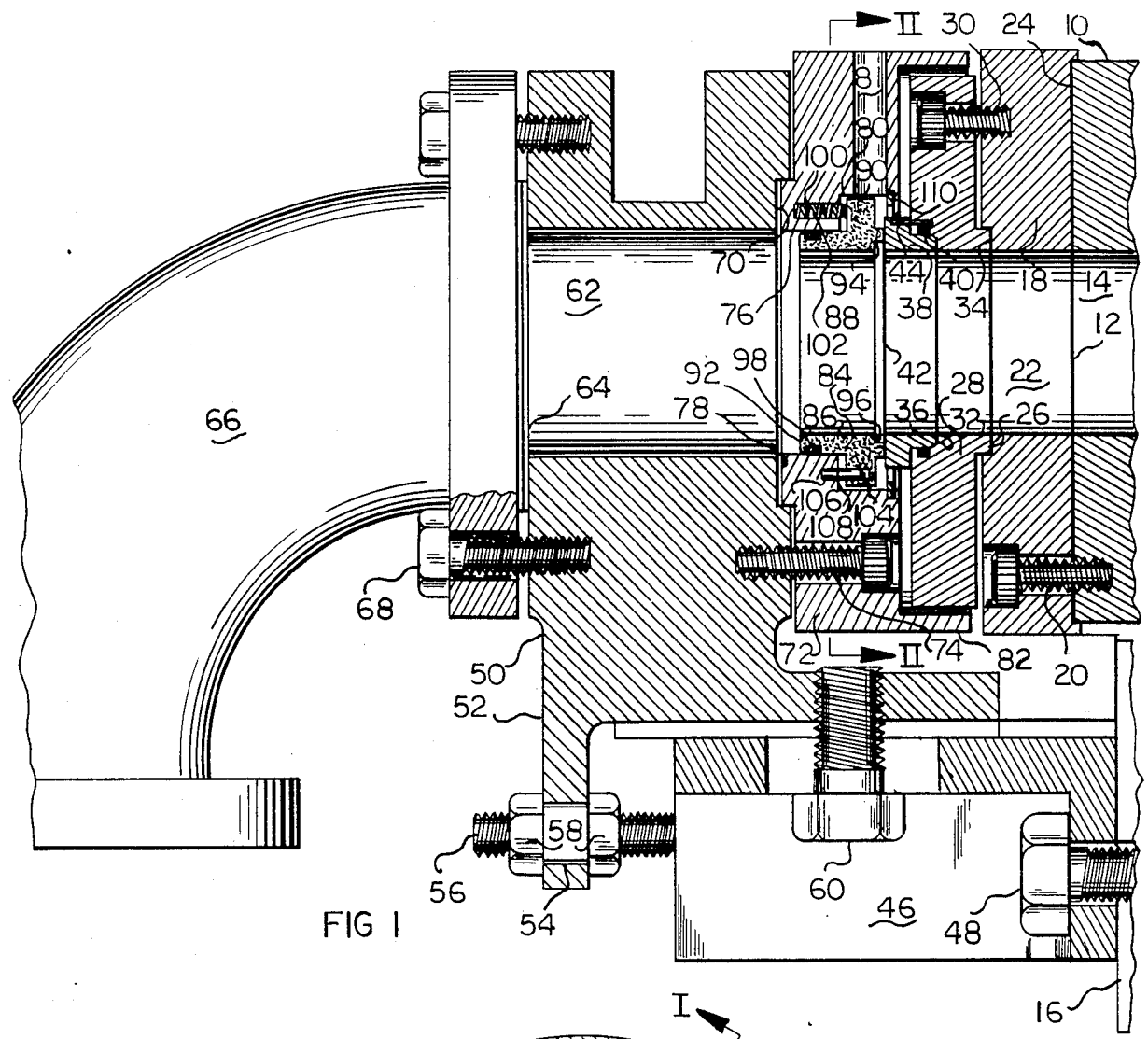
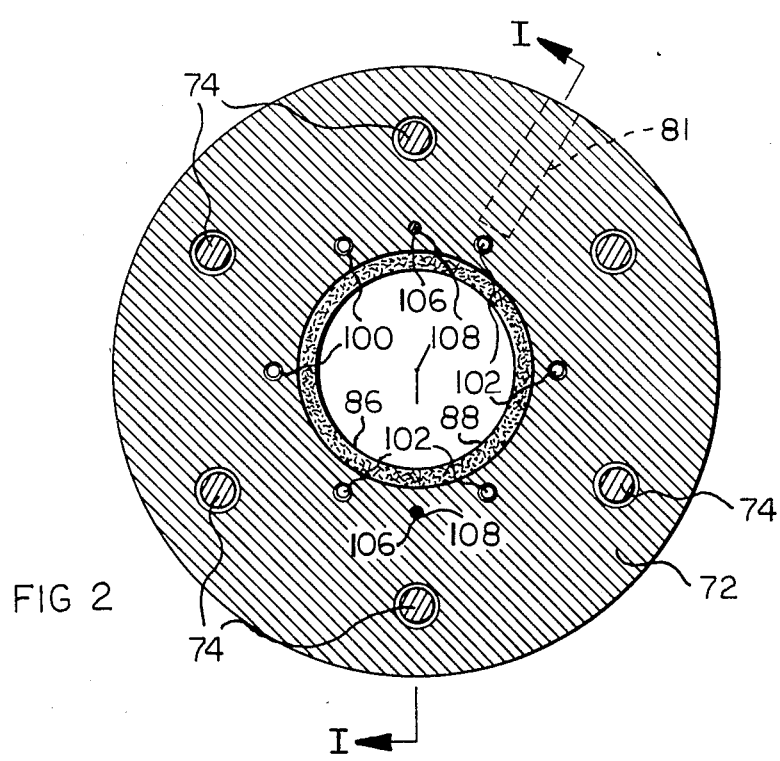

JOURNAL MOUNTED ROTARY JOINT

BACKGROUND OF THE INVENTION

Rotary joints are commonly employed with drying and cooling drums widely used in the paper manufacturing art, and related manufacturing processes, wherein an elongated web succesively engages steam-heated or water-cooled drums for treating the web. Such rotary joints include relatively stationary components communicating with fluid supply or exhaust and drain systems, and rotating components associated with the drum. The joints use a variety of seal arrangements to establish a sealed relationship between the rotating and stationary components, and various mounting arrangements are used with rotary joints to compensate for eccentricity in drum rotation, ease of installation and maintenance, economy of manufacture, thermal expansion, seal wear, etc. The most common mounting for rotary joints used with heat exchanging drums include nonrigid joint body supports which permit a limited movement or adjustment of the joint body relative to the drum journal and wherein limited eccentricity and thermal expansion conditions may be accomplished.

In certain types of applications and installations of rotary heat exchanging drums it is known to directly mount a rotary joint seal in a fixed relationship to the drum journal or shaft. While this type of installation does create some problems, it has the advantage of permitting the rotary joint to be more compact in size as compared with a conventionally supported joint, misalignment problems are minimized, and fewer wearing parts are required. In such an installation, journal-supported components are affixed to the end of the drum journal and include a seal which is fixed with respect to the journal and concentric to its axis of rotation. The joint body is fixed with respect to the journal bearing support structure and includes a seal engaging with the journal supported seal to establish a relatively rotating, but fluid-tight, relationship between the journal and the joint body. A supply or drain conduit communicates with the body for supplying or receiving the fluid passing through the joint and drum. Springs are usually employed in the joint body to bias the body-mounted seal into engagement with the journal seal.

Known journal-mounted rotary joints of the aforedescribed type are commercially available, but problems exist with such known joints, and it is an object of the invention to provide a journal-mounted rotary joint for rotating heat exchanging drums wherein the joint includes unique components and the parts of the joint are economical to manufacture and readily replaceable for service and maintenance purposes.

Another object of the invention is to provide a journal-mounted rotary joint for heat exchanger drums wherein the joint includes a seal having differential area pressure faces wherein the forces imposed upon the seal by the internal fluid pressure are substantially balanced which produces less pressure at the seal contact surfaces to increase the seal life and lower the operating torque of the joint.

Yet another object of the invention is to provide a journal-mounted rotary joint for heat exchanger drums wherein the journal-mounted seal and the joint body mounted seal are located within adapters and seal plates, respectively, which may be readily removed from their associated structure to facilitate repair and replacement.

An additional object of the invention is to provide a journal-mounted rotary joint for heat exchanger drums wherein springs are employed to bias the joint body mounted seal toward the journal-mounted seal, and the springs are isolated from contact with the fluid medium within the joint reducing deleterious effects on the springs.

In the practice of the invention, an annular flange is mounted upon the end of the journal (shaft) of a rotating heat exchanger drum by a set of bolts received within threaded holes defined in the end of the journal. An annular adapter plate is removably bolted to the flange and includes an annular seal coaxial with the journal axis and bore and having a radial sealing face.

The rotary joint body is adjustably mounted in a fixed position upon the journal support structure adjacent the journal wherein the body will be stationary and may be accurately aligned with the journal axis. The body includes an internal chamber which communicates with a body port or conduit which may be attached to a supply for steam or hot or cold water, or the fitting may communicate with a drain system if the joint is employed with the discharge side of the drum.

A radially oriented seal plate is bolted to the joint body and includes an internal cylindrical bore concentric to the journal axis which receives the cylindrical portion of a carbon seal supported in the seal plate. An O-ring is located between the carbon seal and the seal plate bore, and the carbon seal is capable of axial movement within the seal plate bore. Radial pressure surfaces are defined at each axial end of the carbon seal and the area of the surface which imposes an axial force on the seal toward the journal mounted seal is slightly greater than the differential pressure area imposing a force on the carbon seal in the opposite direction. Thus, the fluid pressure within the joint aids in maintaining the two seals in engagement, but the force with which the seals engage is controlled to extend the seal life and lower the operating torque.

A plurality of compression springs are mounted in blind holes defined in the seal plate about its bore, and these compression springs engage a radial flange defined upon the carbon seal imposing a force on the carbon seal to insure engagement of the seal surfaces prior to the presence of a pressurized medium within the joint body. As the compression springs are isolated from the body chamber, and the fluid passing through the joint, the springs are not subjected to corrosion and adverse effects arising from fluid contact.

The joint of the invention is so constructed that metal-to-metal contact of relatively moving parts does not occur, and the adapter and seal plate may be readily removed from their supporting components for replacement and service.

BRIEF DESCRIPTION OF THE DRAWING

The aforementioned objects and advantages of the invention will be appreciated from the following description and accompanying drawing wherein:

FIG. 1 is a sectional view, some parts being shown in elevation, of a rotary joint in accord with the invention, as taken along Section I—I of FIG. 2, and FIG. 2 is a sectional view taken along Section II—II of FIG. 1

DESCRIPTION OF THE PREFERRED EMBODIMENT

In FIG. 1 the outer end of the shaft or journal of a heat exchanging dryer drum, not shown, is shown at 10, and the journal includes a radial end face 12 perpendicular to the axis of rotation of the journal intersected by the journal bore 14 which communicates with the interior of the drum. The journal 10 is supported upon bearings, not shown, which are mounted in conventional journal-bearing holders mounted upon the journal support structure represented at 16.

The heat exchanger drum with which rotary joints of the invention are used will usually be of the steam-heated dryer type, but the drum may receive cold water if the purpose of the drum is to cool the material engaging the drum periphery. Drums using rotary joints of the type herein disclosed will usually have a joint located upon each journal of the drum and one of the joints is usually employed to introduce steam into the drum, while the other joint removes the condensate therefrom.

An annular flange 18 is bolted to the face of the journal 10 by a plurality of bolts 20 evenly spaced about the flange bore 20 which is coaxial with the journal bore 14. The flange includes a countersunk recess 24 for closely receiving the journal end, and the flange bore is recessed at 26 for receiving the adapter as later described.

An annular adapter 28 is bolted to the flange 18 by a plurality of bolts 30 evenly spaced about the adapter bore 32. The adapter includes a concentric boss 34 closely received within the flange recess 26 and the adapter bore is concentrically countersunk at 36 to receive the annular stainless steel or silicon carbide seal 38. The seal 38 includes a reduced diameter portion 35 received within the countersink 36, and an annular groove formed in the adapter receives the resilient O-ring 40 establishing a sealed relationship between the adapter and the seal. The seal 38 includes a flange larger than bore 32 having an outer radial flat sealing face 42 perpendicularly disposed to the axis of the seal and the axis of drum rotation, and the flange of the seal 38 is provided with a blind hole receiving a key pin 44 also received within an aligned blind hole defined in adapter 28. Several key pins 44 may be used and these pins prevent relative rotation between the seal 38 and the adapter 28.

A bracket 46 is bolted to the journal support 16 by bolts 48, and the bracket 46 is fixed relative to the journal 10 and rotating components of the drum. While only the lower portion of the bracket 46 is shown in the drawing, the bracket extends upwardly about and adjacent the joint structure.

The joint body 50 is of a cast metal construction and is mounted upon the bracket 46. The downwardly extending body tang 52 includes a hole 54 which receives the threaded rod 56 mounted on the bracket, and nuts 58 threaded upon rod 56 located upon opposite sides of the tang 52 will accurately axially position the body in the direction of the drum rotative axis and bolts such as at 60 interposed between the body 50 and bracket 46 will fix the body to the bracket once the desired positioning thereto has been achieved.

The body 50 includes a cylindrical chamber 62 coaxial with the journal bore 14, and the bores of the flange 18 and adapter 28, and the chamber intersects the body side 64 to which a conduit fitting 66 may be attached, such as by bolts 68. The fitting 66 illustrated is an elbow to which a steam supply source may be attached, or if the joint is being used to remove water from the heat exchanger drum the elbow will be attached to a drain system, as known. The particular type of fitting mounted to the body 50 is dependent upon the type of the supply or drainage conduits used, not shown.

The body 50 is countersunk at 70 and provided with a radial face located adjacent the annular seal plate 72 bolted to the body by six bolts 74, circumferentially disposed about the seal plate bore 76. The seal plate includes an annular boss 78 closely received within the body countersunk recess 70 to insure concentricity with body 50, and the seal plate includes a concentric countersunk recess 80 surrounding the bore 76. As will be appreciated in FIG. 1, the seal plate 72 includes a radial vent passage 81 communicating with the recess 80 and the seal plate periphery, and an annular ring extension 82 defined on the seal plate axially overlaps the adapter 28.

An annular seal 84 is mounted within the bore 76 and recess 82 of seal plate 72. The seal 84 is preferably formed of carbon and includes an axial bore 86, a reduced diameter cylindrical portion 88, and a radially extending flange 90. The seal includes a radial pressure face 92 located within the bore 76, and an annular axially extending lip 94 terminates in a radial face which sealingly engages the face 42 of the seal 38. As appreciated from FIG. 1, the configuration of the seal 84 includes a recess which defines radial shoulder 96 constituting a pressure face exposed to the fluid pressure within the seal bore, and the surface area of the face 96 is slightly less than the surface area of the end face 92.

The seal portion 88 is grooved for receiving an elastomer O-ring 98 to seal the portion 88 to the seal plate 72 and the fit between the seal portion 88 and the bore 76 is such that relative axial displacement between the seal and seal plate is possible. A plurality of blind holes 100, six in the disclosed embodiment, are bored into the seal plate parallel to the axis of the bore 76 and intersect the recess 80. A compression spring 102 is located within each of the holes 100, and the springs extend from their holes for engagement with the seal flange 90 biasing the seal 84 toward seal 38.

Two sets of opposed blind holes 104 and 106 are formed in the seal flange 90 and seal plate 72, respectively, to receive the axially extending key pins 108 to prevent relative rotation between the seal plate and the seal 84. The seal 84 is retained within the seal plate by snap ring 110 located within a groove defined in the seal plate and the snap ring will engage the flange 90 when the seal lip 94 has been worn to its maximum extent.

During use, the components will be arranged as shown in FIG. 1, initially, the flange 18 will be bolted to the end of the drum journal 10, and the adapter 28 bolted to the flange with the seal 38 in place. The seal plate 72 will be bolted to the joint body 50 and seal 84 will be retained within the seal plate by the snap ring 110.

The body 50 is mounted upon the bracket 46, and adjusted thereto by means of the rod 56 and nuts 58 and fixed by bolts 60, and others, not shown. Initially, the body 50 will be so positioned that engagement of the seal face 42 with the end of the seal lip 94 will produce an axial separation between the snap ring 110 and the flange 90 approximately equal to the axial dimension of the lip. The springs 102 will be engaging the seal flange 90 and bias the seal lip into engagement with the seal 38.

Introduction of a pressurized fluid medium into the body chamber 62, either from fitting 66, or as received from the drum through journal 10, will expose the seal faces 92 and 96 to this fluid pressure. As the force imposed upon the face 92 by fluid pressure tends to displace the seal 84 toward the right, FIG. 1, and the force imposed upon the seal face 96 by the fluid pressure is toward the left, these two forces will oppose and tend to balance each other, and in view of the differential area, the force on the seal face 92 is slightly greater to the right which insures an effective engagement between the seal lip 94 and the seal 38. Of course, the springs 102 also aid in maintaining engagement between the seals 38 and 84, but due to the differential area of the faces 92 and 96 unduly high sealing forces at the sealing faces is prevented which extends the effective life of the seals, and minimizes the resistance to rotation of the rotary joint reducing the torque requirements.

As the lip 94 wears, the seal 84 will slowly move within the seal plate bore 76 toward the seal 38 to accommodate the wear and this automatic compensation will continue until the flange 90 engages the snap ring 110. At such time the joint would be dismantled and the seal 94 replaced.

The vent passage 81 permits any leakage past the seals to be vented to the atmosphere, and a feeler gage may be inserted in the passage 81 to measure the wear that has occured at lip 94.

It is to be noted that the springs 102 are isolated from the fluid pressure within the body 50 or seal plate 72 as the springs are located radially outside of the seal 84, and O-ring 98 and lip 94 will prevent exposure of the springs to the pressurized medium. Thus, the springs are not subjected to adverse corrosive conditions, and exposed to the direct heat of the fluid medium, as is the case with many rotary joint constructions.

The rotary joint illustrated eliminates the possible misalignment of the joint with the drum journal in view of the rigid mounting of the body 50 on the bracket 46. A joint constructed in accord with the disclosure is of a concise configuration, and a minimum of moving parts are required. Properly installed, there is no metal-to-metal contact between relatively movable parts, and as the seals 38 and 84 may be readily replaced, a joint of the described type has a very long effective life. The mounting of the seal 38 in the adapter 28, and the seal 84 in the seal plate 72 permits these relatively economically producible parts to be quickly replaced, when necessary, and maintenance of a rotary joint in accord with the invention requires only average mechanical skills.

It is appreciated that various modifications to the inventive concepts may be apparent to those skilled in the art without departing from the spirit and scope of the invention.

I claim:

1. A rotary joint for direct engagement with the end face of the journal of a rotary heat exchanging drum wherein the journal is of a cylindrical configuration having a concentric bore and a flat end face substantially perpendicular to the journal axis, comprising, in combination, an annular flange concentrically mounted upon the journal end face for rotation therewith, an annular adapter concentrically mounted upon said flange for rotation therewith, said adapter having a bore concentric with the journal bore, a first annular seal mounted on said adapter concentric to said adapter bore having a radial sealing face, a body having an internal chamber and an opening in communication with said chamber, a bracket supporting said body in fixed relation to the drum journal, an annular seal plate mounted upon said body in opposed axial alignment with said adapter, a cylindrical bore defined in said seal plate coaxial with said adapter bore, a second annular seal sealingly mounted within said seal plate bore relatively axially movable therein, an annular seal surface defined on said second seal engaging said first seal face, first and second radially disposed opposed differential pressure surfaces defined on said second seal exposed to the fluid pressure within said body chamber imposing opposed axial forces on said second seal, fluid pressure on said first surface forcing said second seal toward said first seal and fluid pressure on said second surface forcing said second seal away from said first seal, the area of said first surface being greater than the area of said second surface, a plurality of compression springs mounted on said seal plate radially outwardly spaced from said seal plate bore, said second seal isolating said springs from said housing chamber and exposure to the fluid within said joint body, said springs engaging said second seal and biasing said second seal toward said first seal, and conduit means affixed to said body in communication with said opening.

2. In a rotary joint as in claim 1, said second seal including a cylindrical portion received within said seal plate bore and a resilient annular seal ring interposed between said second seal cylindrical portion and said seal plate bore sealing said second seal with respect to said seal plate bore and permitting axial displacement of said second seal within said seal plate bore.

3. In a rotary joint as in claim 2, said second seal being formed of carbon.

4. In a rotary joint as in claim 1, a plurality of blind holes defined in said seal plate radially spaced outwardly of said seal plate bore and parallel thereto opening toward said first seal, said springs being located within said blind holes.

5. In a rotary joint as in claim 2, an annular resilient seal ring interposed between said first seal and said adapter, and key means interconnecting said first seal and said adapter preventing relative rotation therebetween.

6. In a rotary joint as in claim 2, key means interposed between said second seal and said seal plate preventing relative rotation therebetween.

7. In a rotary joint as in claim 4, said second seal including an annular radial flange axially spaced from said cylindrical portion in the direction of said first seal and outwardly extending beyond said cylindrical portion, said springs engaging said radial flange.

8. In a rotary joint as in claim 1, a first set of bolts mounting said annular flange upon the journal end face, a second set of bolts mounting said adapter upon said adapter annular flange, and a third set of bolts mounting said seal plate upon said body.

9. In a rotary joint as in claim 1, said seal plate having an exteriorly accessible periphery, a radial passage defined in said seal plate intersecting said periphery and in axial alignment with said second seal, said passage having an inner end in communication with said second seal whereby the axial position of said second seal may be determined through said passage.

* * * * *